No. 638,535. Patented Dec. 5, 1899.
E. E. WHIPPLE.
WEEDER.
(Application filed Aug. 20, 1897.)
(No Model.) 2 Sheets—Sheet 1.
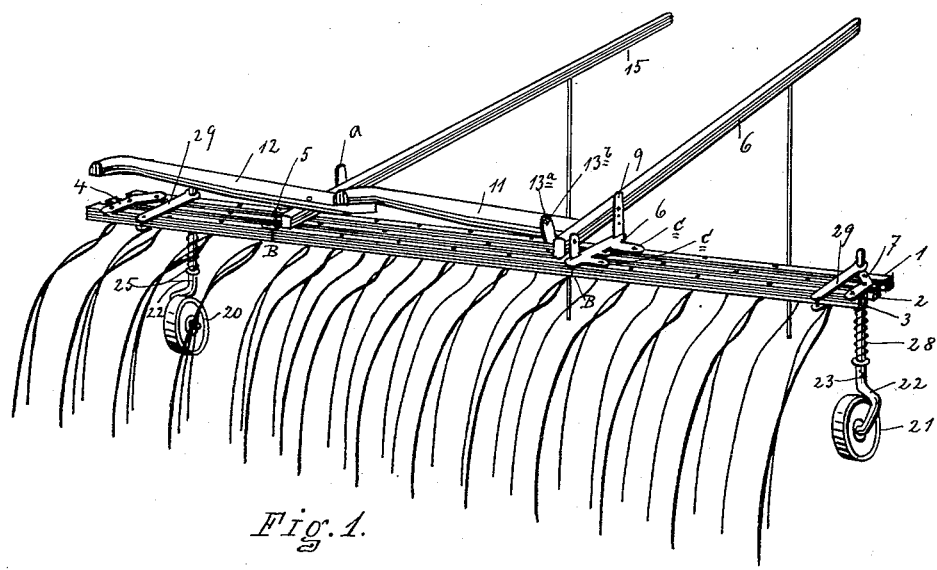
Fig. 1.
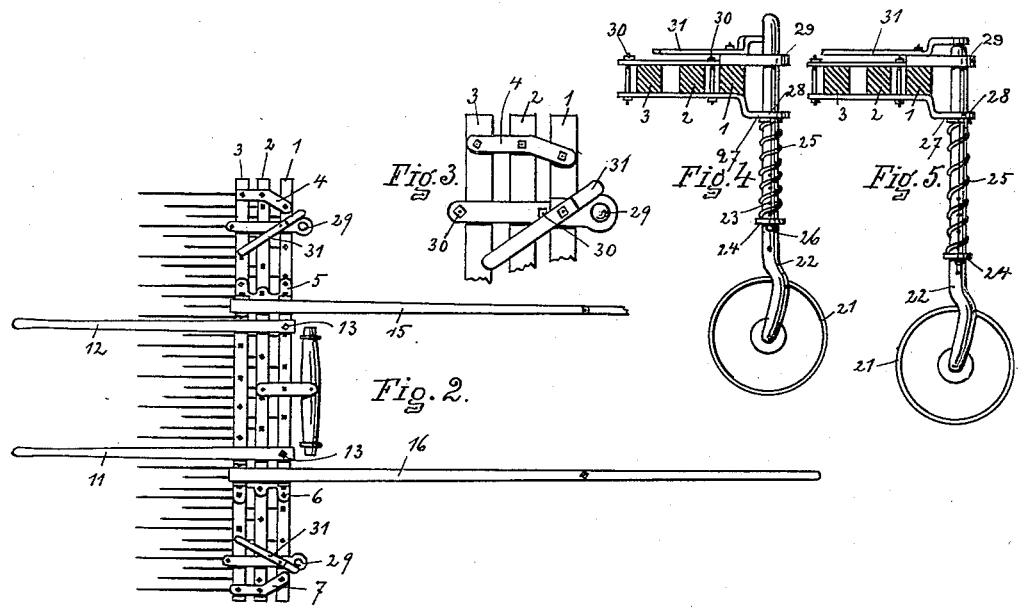
WITNESSES
Rich. A. George
Phebe A. Tanner
INVENTOR
EFFINGER E. WHIPPLE
By Risley Love
ATTORNEY'S
THE NORRIS PETERS CO., PHOTO-LITHO., WASHINGTON, D. C.

No. 638,535. Patented Dec. 5, 1899.
E. E. WHIPPLE.
WEEDER.
(Application filed Aug. 20, 1897.)
(No Model.) 2 Sheets—Sheet 2.

WITNESSES.
Rich. A. George.
Phebe A. Tanner

INVENTOR
EFFINGER E. WHIPPLE.
By Risley Love
ATTORNEY's

UNITED STATES PATENT OFFICE.

EFFINGER E. WHIPPLE, OF UTICA, NEW YORK, ASSIGNOR TO THE STANDARD HARROW COMPANY, OF SAME PLACE.

WEEDER.

SPECIFICATION forming part of Letters Patent No. 638,535, dated December 5, 1899.

Application filed August 20, 1897. Serial No. 648,883. (No model.)

*To all whom it may concern:*

Be it known that I, EFFINGER E. WHIPPLE, of Utica, in the county of Oneida and State of New York, have invented certain new and useful Improvements in Weeders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in an agricultural tool commonly termed a "weeder;" and it consists in the mechanism hereinafter more particularly pointed out and claimed.

Figure 6:
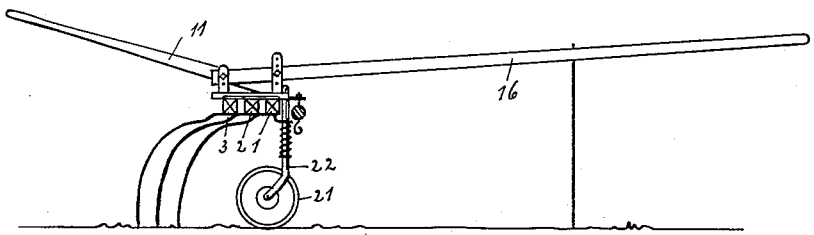
Figure 9:
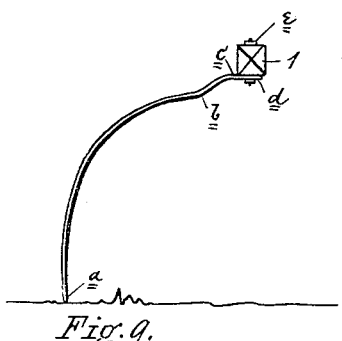
Figure 7:
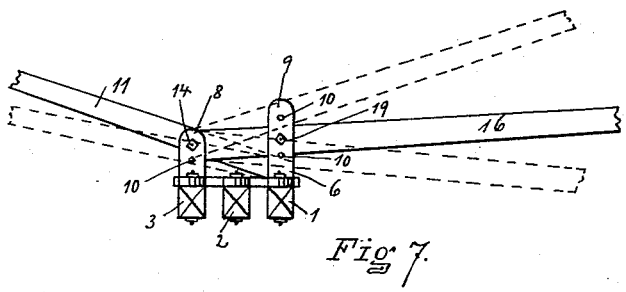
Figure 10:
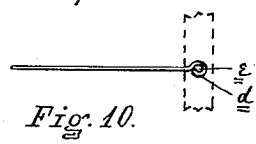
Figure 8:
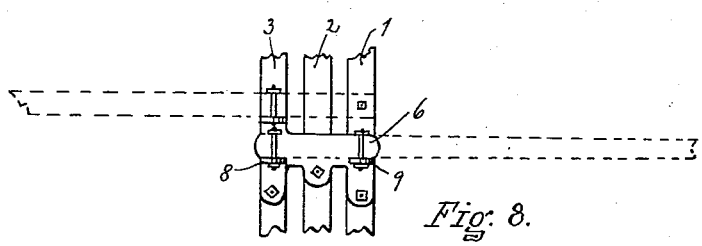

In the accompanying drawings, Figure 1 is a rear view of my weeder in working position. Fig. 2 is a top view of the same, a portion of one of the shafts being removed. Fig. 3 is a detailed view of a portion of the frame and the connecting mechanism. Fig. 4 is a side view of the wheel, spring, and sectional end view of the frame and the accompanying mechanism as the same appears when the weeder is in use. Fig. 5 is the same view as Fig. 4, the difference being that Fig. 5 shows the position of the wheels when the weeder is ready to be transported. Fig. 6 is an end view of the weeder as the same appears when in use. Fig. 7 is a side view of the handles, shafts, the adjusting-brackets, and an end view of the bars, the dotted lines showing the position into which the handles and shafts can be adjusted, the broken lines indicating portions removed. Fig. 8 is a top view of Fig. 7, the dotted lines showing the location of the shafts and the handles. Fig. 9 is a side view of my tooth and an end view of the tooth-beam. Fig. 10 is a view of the section of the tooth-beam shown from the under side with the tooth attached.

In the drawings similar numerals refer to corresponding parts in the several views.

The best form with which I am familiar of producing my weeder is illustrated in the drawings, in which I form the frame portion of three bars 1, 2, and 3, arranged in the same horizontal plane and properly separated from each other where they are held by brackets 4, 5, 6, and 7, which brackets are secured to the bars by bolts and nuts which pass through the brackets and the bars. On each of the brackets 5 and 6 I provide upwardly-extending flanges 8 and 9. (Best shown in Fig. 7.) These flanges are provided with a series of adjusting-holes 10 for adjusting the pitch of the handles as well as of the shaft. The handles 11 and 12 are attached loosely to the bar 1 at 13. (Best shown in Fig. 2.) Back of the attaching-point 13 on the front bar I provide a bracket $13^a$, (best shown in Fig. 1,) the bracket being provided with horizontal holes through which the bolt $13^b$ passes, so that the handles may be elevated or lowered by means of the bolt $13^b$ in bracket $13^a$, Fig. 1. For adjusting the shafts I bolt their rear to flanges 8, Fig. 7, and to flanges 9, same figure, and their elevation and depression are accomplished by bolts and nuts 14 and 19 of the same figure. By elevating or depressing the bolts in holes 10 on the two brackets the shafts 15 and 16 can be accommodated in their elevation or depression to the size of the horse and to regulate the pitch of the teeth, and the bolts and nuts are used in elevating or depressing the pitch of the shafts. These bolts pass through the shafts and engage the flanges on the bracket. Heretofore all of the weeders with which I am familiar have been so constructed that the whole weight of the frame and teeth is carried on the teeth themselves, so that the weight presses the teeth into the ground and frequently destroys the young and growing crop where the weeder is used, and to overcome this tendency the operator has to carry by the handles a portion of this weight to prevent the working points of the teeth going too far into the ground. To overcome all these and many other difficulties not mentioned, I provide substantially what may be termed "caster-wheels," which are attachable or detachable at the will of the operator. Wheels 20 and 21 are mounted in the lower end of the standard or bearing 22. In the shank portion of the standard or bearing I provide a series of adjusting-holes 23 for adjusting the tension of the coil-spring 25, the lower end of which rests on a collar or washer 24. (Illustrated in Figs. 4 and 5.) By raising or lowering the washer by means of the adjusting-holes and a suitable pin or peg 26 inserted in the holes the required tension on the springs can be secured. The upper end of the spring on each of the bearings engages the under side of bracket 27, secured against the under side of the teeth-carrying bars. In the front end of this bracket is a circular hole 28 in which the bearing of the wheel is free to rotate and to move up and down, depending upon the elasticity of the compression-spring.

The upper bracket 29 29 (shown in Fig. 2) is placed on the upper side and provided with openings for the bearing of the wheels to work in same freely. The upper and lower brackets are held together by clamping-bolts 30. These bolts hold the brackets on opposite sides of the tooth-bars, so that these brackets can be attached or detached through the operation of the bolts and nuts. The wheel-bearings are free to rotate in the openings in these brackets and also to move upward and downward when the weeder is in practical use.

When it is desired to transport the weeder from field to field, the movable stops 31 31, which are bolted to the top of the brackets, the bolt forming the pivotal point, can be swung over the tops of the wheel-standards and thus prevent the vertical movement of the wheel bearing or standard, as shown in Fig. 5, so that the weeder can be transported without its teeth engaging in the ground, and by swinging these stops so that the front end is swung clear of the top of the wheel-bearing the wheels and bearings are free to move up and down and the working portions of the weeder are carried on the springs, which prevents the working points of the teeth going deeply into the ground.

Changes and modifications in the operation of this can be made without departing from the spirit of my invention, which consists in carrying under spring tension by suitable mechanism a portion of the weight of the weeder.

Another feature of my invention is that in order to have all of the teeth of the same length attached to the bars forming the head of the weeder I provide a curved spring-tooth of peculiar construction, the tooth being round in cross-section. From the working point $a$, Fig. 9, the tooth curves upwardly and forwardly in a continuous curve of practically the same radius until it reaches $b$ in the same figure. Then the tooth takes an oblique angle upward and forward until the butt $c$ is reached in the same figure, and the tooth is then provided with horizontal eye $d$. (Shown in Fig. 10.) The under side of the tooth-beam to which the teeth are attached is recessed to receive the eye $d$ of the tooth. The bolt $e$ passes through the eye and the beam with a nut on the top, as shown in Figs. 9 and 10. The portion of the under side of the tooth-bar adjacent to the eye of the tooth is also recessed to receive a portion of the shank of the tooth. By this arrangement teeth of the same length can be used on the various bars without being limited in their elastic movement by the remaining bars, as illustrated fully in the drawings.

Another feature of my invention consists in forming bars 1, 2, and 3 in sections, so that both ends of the weeder outside of brackets 5 and 6 can be detached. Each of the bars 1, 2, and 3 is formed in three pieces, as shown in Fig. 1 at B, placed end to end and bolted through flanges C. (Best illustrated in Fig. 1.) By removing these bolts in the flanges of brackets 5 and 6 the portion of the weeder on either side of the shafts can be removed so that the weeder can be narrowed up for use between rows of growing crops.

What I claim as new, and desire to secure by Letters Patent, is—

1. A weeder having frame-bars, teeth, handles and shafts, in combination with caster-wheels mounted on standards supported on the frame, springs on the wheeled standards and mechanism for adjusting the tension of the springs, substantially as set forth for the purposes stated.

2. A weeder having substantially horizontally-disposed frame-bars, in combination with wheeled standards, a spring on the standards interposed between the frame-bars and the wheels and means, substantially as set forth, for adjusting the tension of the springs, for the purposes stated.

3. In a weeder having a series of horizontally-disposed frame-bars, in combination with wheeled standards, springs between the wheels and the frame on the standards, perforated brackets for carrying the wheeled standards, substantially as set forth, for the purposes stated.

4. In a weeder, having a series of horizontally-disposed frame-bars, in combination with wheeled standards, springs between the wheels and the frame on the standards, perforated brackets for carrying the wheeled standards and movable stops arranged for limiting the upward movement of the wheeled standards for the purposes stated.

In witness whereof I have affixed my signature in presence of two witnesses.

EFFINGER E. WHIPPLE.

Witnesses:
 PHEBE A. TANNER,
 RICH. A. GEORGE.